United States Patent
Lilljeforss

[15] 3,683,703
[45] Aug. 15, 1972

[54] PRESSURE GAUGE
[72] Inventor: Gustaf Lennart Lilljeforss, Lidingo, Sweden
[73] Assignee: AGA Aktiebolag, Lidingo, Sweden
[22] Filed: March 23, 1970
[21] Appl. No.: 21,706

[30] Foreign Application Priority Data
April 1, 1969 Sweden .....................4582/69

[52] U.S. Cl. .....................................73/403, 73/393
[51] Int. Cl. .................................................G01i 7/22
[58] Field of Search ..............................73/403, 393

[56] References Cited
UNITED STATES PATENTS 1,945,042  1/1934  Ingram .......................73/403
1,950,241  3/1934  Hodgson et al. .............73/403
3,212,195  10/1965  Paarma et al. ................33/209

*Primary Examiner*—Donald O. Woodiel
*Attorney*—Larson, Taylor and Hinds

[57] ABSTRACT

A pressure gauge comprises a housing, a main chamber in the housing partly filled with a liquid and a body floating in the liquid. A portion of the body extends through an opening in the housing. A fluid to be measured is introduced into the chamber above the liquid and its pressure is exerted on the surface of the liquid thus causing the body to assume a floated position. A scale is provided outside the housing and the position of the body, and thus the pressure in the measuring chamber, is indicated by the position of the body portion relative to the scale.

14 Claims, 8 Drawing Figures

Patented Aug. 15, 1972

INVENTOR
GUSTAF LENNART LILLJEFORSS

BY *Larson and Taylor*

ATTORNEYS

Patented Aug. 15, 1972
3,683,703
2 Sheets-Sheet 2
FIG. 2
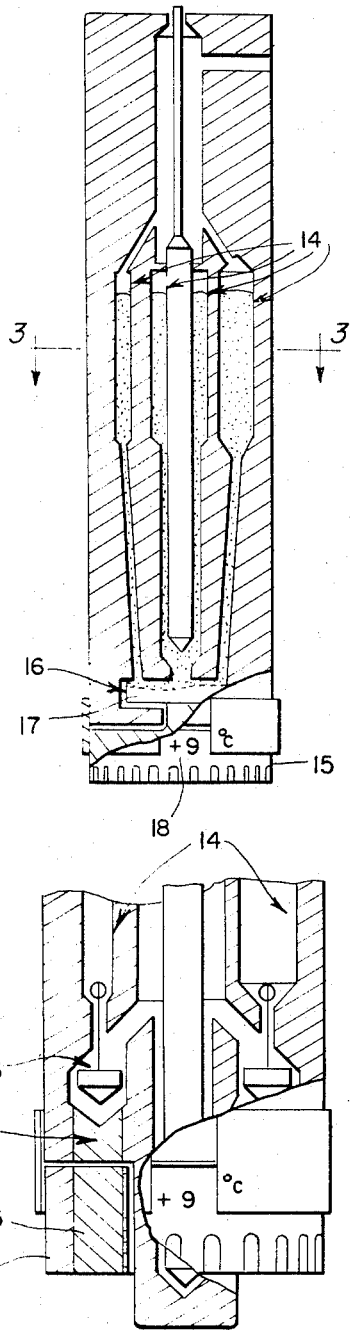
FIG. 3
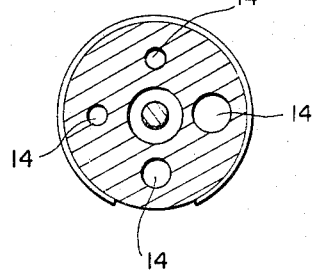
FIG. 5
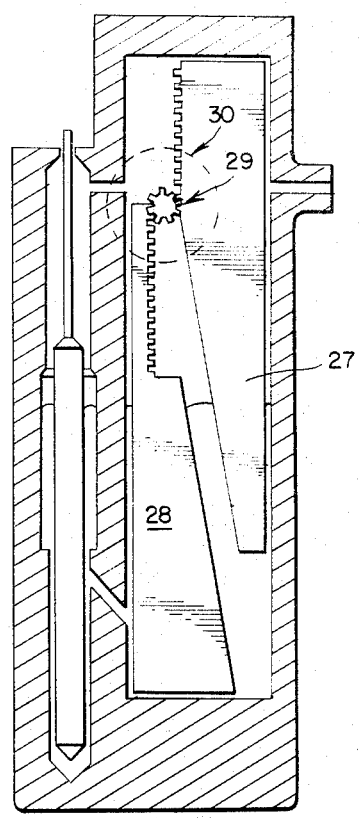
FIG. 4
FIG. 6
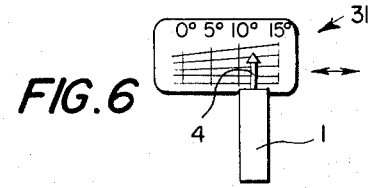
INVENTOR
GUSTAF LENNART LILLJEFORSS
BY Larson and Taylor
ATTORNEYS

PRESSURE GAUGE

BACKGROUND OF THE INVENTION

The present invention relates to an instrument for the measuring of pressure. Instruments of this type usually consist of a housing with a measuring chamber to which the medium is introduced whose pressure is to be measured. In the measuring chamber a body is provided to indicate the pressure against a scale.

Known devices of this type have many disadvantages which make the instrument unsuitable for industrial use. For example, the housing has to be made of a transparent material to allow the body inside the chamber to be visible. Transparent material such as glass often cannot withstand the high pressure which may occur in industrial operation. Another disadvantage is the relatively large size which such an instrument must have.

For the measurement, for example, of the residual amount of gas in "empty" acetylene cylinders, the following demands are made on the pressure gauge:

1. it must present good measuring accuracy at low pressure (0.8–5 atmospheres)
2. it must stand a pressure which is about one hundred times as high (i.e. about 337 atmospheres, the pressure which arises when acetylene at a pressure of 31 atmospheres is split into carbon and hydrogen)
3. it must not contain alloys with silver or with copper content over 65 percent
3. it must not contain alloys with silver or with copper
4. it must not consist of glass or other transparent material of imperfect strength and
5. it must be sturdy but not necessarily portable, have small dimensions and be cheap to manufacture.

BRIEF SUMMARY OF THE PRESENT INVENTION

In accordance with the present invention, the above-mentioned requirements have been met and an instrument of good measuring accuracy has been obtained. Moreover, the instrument gives a linear indication and the reading can be carried out on a linear scale.

The instrument in accordance with the invention is characterized in that the movable body is bar-shaped and that it projects from the measuring chamber through an opening. At the opposite end the movable body has a counter-weight. By optionally providing the instrument with compensation chambers which can be connected to the measuring chamber, it becomes possible to correct the instrument for the measurement of the pressure of fluids at, for example, different temperatures of different pressure ranges.

The instrument according to the invention comprises a housing, a main chamber in said housing partly filled with a liquid, means defining an opening in the wall of said measuring chamber above the level of said liquid, a rigid body floating in said body and extending upwardly through said opening, said body being freely moveable in said opening upon motion of said body due to changes in the liquid level in said measuring chamber, conduit means to introduce a fluid the pressure of which is to be measured into said measuring chamber above said liquid level, and means for indicating the distance moved by the portion of said body extending outside of said measuring chamber in response to fluid pressure above said liquid level.

DETAILED DESCRIPTION

A preferred embodiment of the instrument in accordance with the invention is shown in the enclosed drawings, wherein:

FIG. 2 is a longitudinal sectional view of a modified embodiment of the instrument in accordance with FIG. 1;

FIG. 3 is a section view along the line A—A of FIG. 2;

FIG. 4 is a detail section view of an embodiment of a change-over arrangement alternative to that shown in FIG. 2;

FIG. 5 is a longitudinal cross section view of an alternative instrument according to the invention;

FIG. 6 shows a simple embodiment fot the correction of the instrument scale readings;

Figure 1:
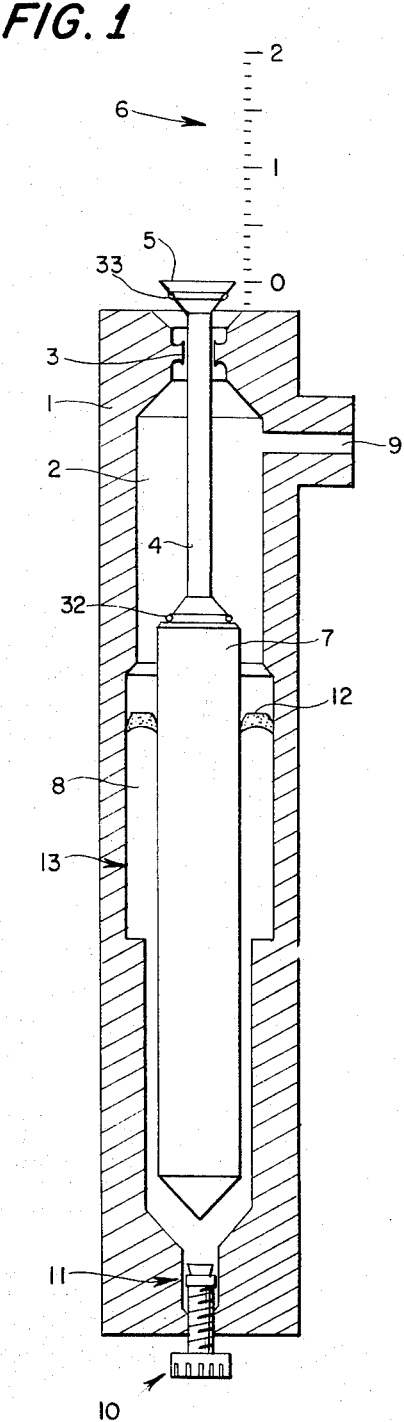
FIG. 1 is a longitudinal cross-section view through an instrument according to the invention.

In FIG. 1 is shown the housing 1 of the instrument with a tubular measuring chamber 2, which has an opening 3 through the housing wall. This opening is adapted to a bar-shaped body 4 which projects through the opening and has a first end 5 constituting an indicator for reading against a linear scale 6. At the other end of the body 4 a counter-weight 7 is accomodated. The counter-weight 7 is partly immersed in a liquid 8 present in the measuring chamber 2, which may preferably be mercury or some other heavy liquid. An inlet tube 9 serves to introduce the medium whose pressure is to be measured into the measuring chamber. A wheel 10 with a plunger 11 is provided for adjustment of the zero point of the instrument by adjustment of the liquid level in the measuring chamber 2. On top of the liquid 8 a layer of a protective liquid 12 may be placed so that the medium whose pressure is to be measured cannot come into contact with the liquid 7.

The device is utilized to measure pressure in the following manner. The zero position of indicator 5 is adjusted by manipulation of wheel 10 as necessary. The fluid to be tested, such as acetylene gas, is introduced into the measuring chamber 2 through conduit 9. The gas pressure above the liquid forces the floating body to rise a distance linearly proportional to the increase in the pressure in chamber 2. Scale 6 is conveniently calibrated to read pressure directly. In a preferred embodiment, the tubular measuring chamber 2 is provided in a portion 13 which corresponds to the section where the liquid level moves during use of the instrument, with well finished walls. Thus, accurate measuring values can be obtained without excessive accuracy having to be devoted to the manufacture of the remaining walls of the measuring chamber 2.

It will be readily apparent that the useful range of the device will be limited by the distance which the floating body can move. Accordingly, in a preferred embodiment, the device includes means to alter the surface area of the liquid supporting the float to alter the distance that the body moves in response to a given fluid pressure in the measuring chamber. When the surface is large, a given pressure will cause a relatively large motion of the body. Correspondingly, when the area is reduced, the same pressure above the liquid with cause a relatively small motion of the body.

For some measurements, such as the measurement of acetylene gas pressure, the primary purpose is to determine the amount of material present. In this event, it is necessary to compensate for variations in the gas temperature. According to the invention, this is readily accomplished by utilizing the above-mentioned means for altering the surface area of the liquid in the measuring chamber. Thus, when a hot gas is introduced, the liquid surface area is reduced an amount corresponding to the extra pressure occasioned by the elevated temperature. In an alternative arrangement, temperature compensation can be accomodated by a set of scales moveable into alignment with the body portion extending outside the housing.

For the compensation of, for example, variations of temperature, the instrument can be provided with a number of compensation chambers 14 which are shown in the FIGS. 2–4. These are connected to the upper and to the lower parts of the measuring chamber 2. The lower connecting point is regulatable by means of a change-over device. The change-over device of FIG. 2 comprises a wheel 15 placed at the base of the housing 1 and a disc 16 arranged on the same axle as the wheel 15. In the upper surface of the disc 16 is a recess 17 which comprises the central portion and a sector of the disc. The lower end of measuring chamber 2 is located just above the central portion of the said disc 16 and the lower ends of compensating chamber 14 are located just above the edge of the disc 16. By twisting of the disc 16 one or more of the compensating chambers 14 can be connected to the measuring chamber 2 via the recess 17. The wheel 15 may be provided with a scale 18, which indicates the degree of temperature compensation that has been set.

FIG. 4 shows an alternative change-over device. The sealing of the compensation chambers 14 takes place in this embodiment by means of the valve bodies 23 present in each, which normally float and keep the compensation chamber open, but which on twisting of the annular wheel 24, which contains one or more magnets 25, are forced down and close the compensating chambers 14. The housing is provided in this embodiment appropriately with magnetically conducting bushings 26 which increase the magnetic force and give better selectivity for the effect on the valve bodies 23.

In FIG. 5 is shown in instrument with compensation chambers of a somewhat different type. The compensation chambers are provided here with two wedges 27 and 28 which are displaceable in relation to one another. They can be actuated by the gearwheel 29 on the axle of a wheel 30 and allow continuous compensation without the zero adjustment being affected. The size and shape of the wedges 27 and 28 are selected such that a change induced in the compensation chamber volume by motion of one wedge in a first direction to change the surface area of the liquid therein is compensated for by motion of the other wedge in the other direction. Thus, the surface area is continuously alterable without changing the liquid level.

FIG. 6 shows another and very simple method for the compensation of the instrument. By lateral displacement of the scale 31 whose scale-lines are arranged in a fan shape, the scale can be adjusted in relation to the bar shaped body 4 for different degrees of compensation.

The measuring with the instrument is simple and requires few movements once the instrument has been adjusted to zero. The compensation can take place without the zero adjustment being affected. Before the start of the measurement the correct degree of compensation is set. Then the medium whose pressure is to be measured is fed to the measuring chamber 2 and any compensation chambers which may be connected. On putting the measuring chamber under pressure, a certain leakage will occur through the opening 3. This leakage is preferably very small however, since the opening is well fitted to the bar shaped portion of the float body.

Figure 8:
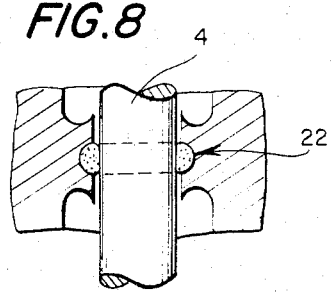
FIGS. 7 and 8 show alternative embodiments of the seal of the opening of the chamber.
Figure 7:
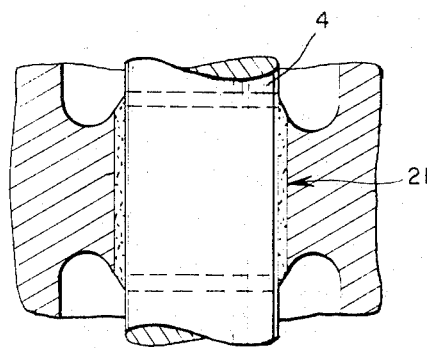

As can be seen from FIGS. 7 and 8 the opening 3 can be sealed by filling the gap between the housing 1 and the bar 4 with a wetting liquid seal 21 (FIG. 7) or by filling an annular groove in the wall of the housing 1 with a non-wetting liquid 22 (FIG. 8).

At certain measuring operations where very good accuracy of the measuring result is desirable, a certain leakage may be an advantage. Due to the turbulence which occurs at the opening 3, the bar shaped body 4 with the counter-weight 7 is induced to vibrate so that these parts are not retained together by surface tension forces and friction. To further reduce friction, the opening through which the bar shaped body projects can be formed by a hollow edge with an acute angle so as to prevent the settling of dust particles in the opening.

The instrument is intended for a certain limited measuring range, but should the pressure of the medium introduced exceed the highest pressure specified within the measuring range, the instrument will be able to withstand this too. By shaping the opening 3 as a valve seat, a sealing ring 32 fitted to the top of the counter-weight 7 can seal the opening 3, should the measuring deflection be maximum. In a corresponding manner, the outer end of the bar 4 may be provided with a sealing ring 33, so that the opening 3 is sealed if the pressure in the chamber 2 gets below a certain value. The sealing rings 32 and 33 can, of course, also be fitted in the housing 1 instead.

The range of application mentioned above, namely the measurement of the residual gas in "empty" acetylene gas cylinders, constitutes only one example of the spheres of application for which the instrument in accordance with the present invention is suitable. The instrument is of course applicable in any industrial pressure measurement.

What is claimed is:

1. An instrument for measuring pressure comprising: a housing; a measuring chamber in said housing partly filled with a liquid; means defining an opening in the wall of said measuring chamber above the level of said liquid; an elongated rigid body floating vertically in said liquid and extending upwardly through said opening with a substantial portion thereof submerged in the liquid, sealing means in the opening surrounding said body, said body being freely moveable longitudinally in said opening; conduit means to introduce a fluid the pressure of which is to be measured into said measuring chamber above said liquid level and about a portion of the body extending above the liquid level whereby said body moves longitudinally in said opening in response to pressure in the measuring chamber above said liquid level relative to pressure outside of said opening in said housing wall; and means for indicating a distance moved by the portion of said body extending outside of said measuring chamber in response to fluid pressure in said measuring chamber above said liquid level the effective weight of said body increasing at higher pressure within said housing as the body rises relative to the level of liquid in said chamber.

2. An instrument according to claim 1 wherein said measuring chamber includes a portion having accurately machined walls, said liquid level being located adjacent said accurately machined walls.

3. An instrument according to claim 1 including means for altering the surface area of the liquid supporting said body in said measuring chamber.

4. An instrument according to claim 3 wherein said surface area altering means comprises at least one compensating chamber containing liquid at substantially the same level as the liquid level in said measuring chamber, and means for interconnecting said measuring chamber and said compensating chamber at points above and below the liquid level to alter the surface of the liquid in which said body floats.

5. An instrument according to claim 4 including a plurality of compensating chambers and means for connecting one or more of said compensating chambers with said measuring chamber.

6. An instrument according to claim 5 wherein said connecting means comprises a revolving body including an eccentric recess moveable into adjacency with the lower end of each compensating chamber to provide a fluid interconnection between the measuring chamber and each compensating chamber.

7. An instrument according to claim 5 wherein said connecting means comprises a rotating body including at least one magnet operable to actuate valve means interconnecting said measuring chamber and each compensating chamber.

8. An instrument according to claim 3 wherein said altering means comprises a constant volume, variable surface area compensating chamber and wherein said instrument includes means to vary the surface area of said compensating chamber.

9. An instrument according to claim 8 wherein said compensating chamber comprises two wedge-shaped wall elements each moveable relative to one another and having a size and shape such that a change induced in the chamber volume by motion of one element in a first direction to change the surface area of liquid in the compensating chamber is compensated for by motion of the other element in the opposite direction.

10. An instrument according to claim 1 wherein said body is provided with means for sealing said opening when pressure in the measuring chamber is above or below the measuring range of the instrument.

11. An instrument according to claim 1 including sealing means for sealing the gap between the body and said opening.

12. An instrument according to claim 1 wherein said liquid is protected from said fluid being measured by a layer of a second liquid on the surface of said liquid.

13. An instrument according to claim 1 wherein said indicating means comprises a scale adjacent the portion of said body extending through said opening outside said housing.

14. An instrument according to claim 13 wherein said scale is laterally displaceable with respect to said body portion.

* * * * *